United States Patent
Shao et al.

(10) Patent No.: US 12,192,690 B2
(45) Date of Patent: Jan. 7, 2025

(54) METHOD AND INTERNET OF THINGS SYSTEM FOR GAS USAGE MONITORING AND WARNING BASED ON SMART GAS

(71) Applicant: CHENGDU QINCHUAN IOT TECHNOLOGY CO., LTD., Sichuan (CN)

(72) Inventors: Zehua Shao, Chengdu (CN); Bin Liu, Chengdu (CN); Junyan Zhou, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/363,727

(22) Filed: Aug. 1, 2023

(65) Prior Publication Data
US 2023/0379604 A1    Nov. 23, 2023

Related U.S. Application Data

(63) Continuation of application No. 18/067,731, filed on Dec. 19, 2022, now Pat. No. 11,863,920.

(30) Foreign Application Priority Data

Nov. 21, 2022 (CN) .......................... 202211452485.9

(51) Int. Cl.
*G08B 31/00* (2006.01)
*G08B 25/10* (2006.01)
(Continued)

(52) U.S. Cl.
CPC .............. *H04Q 9/02* (2013.01); *H04L 67/12* (2013.01); *H04Q 2209/60* (2013.01)

(58) Field of Classification Search
None
See application file for complete search history.

(56) References Cited

U.S. PATENT DOCUMENTS

| 9,535,917 B1 | 1/2017 | Lin | |
| 11,863,920 B2 * | 1/2024 | Shao | ........................ H04Q 9/02 |
| (Continued) | | | |

FOREIGN PATENT DOCUMENTS

| CN | 105185051 A | 12/2015 |
| CN | 106527327 A | 3/2017 |
| (Continued) | | |

OTHER PUBLICATIONS

CN-107846446-A English Language Translation (Year: 2018).*
CN-113343056-A English Language Translation (Year: 2021).*
CN-112950855-A English Language Translation (Year: 2021).*

*Primary Examiner* — Curtis A Kuntz
*Assistant Examiner* — Jerold B Murphy
(74) *Attorney, Agent, or Firm* — METIS IP LLC

(57) ABSTRACT

The present disclosure provides a method and an Internet of Things system for gas usage monitoring and warning based on smart gas, the method is performed by a smart gas safety management platform of an Internet of Things system for gas usage monitoring and warning based on smart gas, comprising: obtaining gas usage data from at least one gas device, based on the gas usage data, determining a gas monitoring object from the at least one gas device; determining initial objects based on the gas monitoring object and a gas usage threshold; processing historical gas data of the initial objects by using an evaluation model to determine suspicions of the initial objects, wherein the evaluation model is a machine learning model; and sending gas usage safety warning information to a gas user corresponding to the target object.

16 Claims, 5 Drawing Sheets

(51) Int. Cl.
*H04Q 9/00* (2006.01)
*H04Q 9/02* (2006.01)
H04L 67/12 (2022.01)

(56) References Cited

U.S. PATENT DOCUMENTS

2012/0326884 A1\* 12/2012 Cornwall .................. F17D 3/01
                                                                                             340/870.02
2021/0125253 A1    4/2021  Vega et al.
2023/0073685 A1    3/2023  Shao et al.
2023/0167950 A1    6/2023  Shao et al.

FOREIGN PATENT DOCUMENTS

| | | | | |
|---|---|---|---|---|
| CN | 206095333 | U | 4/2017 | |
| CN | 103134561 | B | 9/2017 | |
| CN | 107846446 | A * | 3/2018 | ........... G01F 15/061 |
| CN | 111091149 | A | 5/2020 | |
| CN | 111539563 | A | 8/2020 | |
| CN | 112084229 | A | 12/2020 | |
| CN | 112945333 | A | 6/2021 | |
| CN | 112950855 | A * | 6/2021 | |
| CN | 113343056 | A * | 9/2021 | |
| CN | 115017970 | A | 9/2022 | |
| CN | 115356978 | A | 11/2022 | |
| JP | 2016114990 | A | 6/2016 | |
| KR | 20080035407 | A | 4/2008 | |
| WO | 2021213546 | A1 | 10/2021 | |

\* cited by examiner

METHOD AND INTERNET OF THINGS SYSTEM FOR GAS USAGE MONITORING AND WARNING BASED ON SMART GAS

CROSS-REFERENCE TO RELATED APPLICATIONS

This application is a continuation of U.S. application Ser. No. 18/067,731, filed on Dec. 19, 2022, which claims priority of Chinese Patent Application No. 202211452485.9, filed on Nov. 21, 2022, the contents of each of which are hereby incorporated by reference.

TECHNICAL FIELD

The present disclosure relates to the field of gas safety, and in particular to a method and Internet of Things system for gas usage monitoring and warning based on smart gas.

BACKGROUND

During the use of gas, the situation of the gas usage needs to be inspected, monitored, and warned, etc. Usually, most of the gas safety warnings is used to analyze, judge, and treat gas leakage and abnormal gas pressure. However, the safety hazards of normal gas usage should not be ignored as well.

Therefore, it is expected to provide a method and Internet of Things system for gas usage monitoring and warning based on smart gas, so as to improve the safety of gas usage.

SUMMARY

One or more embodiments of the present disclosure provide a method for gas usage monitoring and warning based on smart gas, which is performed by a smart gas safety management platform of an Internet of Things system for gas usage monitoring and warning based on smart gas, comprising: obtaining gas usage data from at least one gas device through a smart gas household device sensing network platform of the Internet of Things system and sending the gas usage data to the smart gas safety management platform, wherein the at least one gas device is configured in a smart gas household device object platform of the Internet of Things system; based on the gas usage data, determining a gas monitoring object from the at least one gas device; determining initial objects based on the gas monitoring object and a gas usage threshold; processing historical gas data of the initial objects by using an evaluation model to determine suspicions of the initial objects, wherein the evaluation model is a machine learning model and obtained through joint training; determining a target object based on the suspicions; and sending gas usage safety warning information to a gas user corresponding to the target object.

One of the embodiments of this present disclosure provides an Internet of Things system for gas usage monitoring and warning based on smart gas, wherein the Internet of Things system comprises a smart gas user platform, a smart gas service platform, a smart gas safety management platform, a smart gas household device sensing network platform and a smart gas household device object platform interacted in sequence, wherein the smart gas safety management platform includes a smart gas household safety management sub-platform and a smart gas data center, the smart gas data center is configured to: obtain gas usage data from at least one gas device through the smart gas household device sensing network platform and send the gas usage data to the smart gas household safety management sub-platform, wherein the at least one gas device is configured in the smart gas household device object platform; the smart gas household safety management sub-platform is configured to: based on gas usage data, determine a gas monitoring object from at least one gas device; determine initial objects based on the gas monitoring object and a gas usage threshold; process historical gas data of the initial objects by using an evaluation model to determine suspicions of the initial objects, wherein the evaluation model is a machine learning model and obtained through joint training; determine a target object based on the suspicions; and send the gas safety warning information to the smart gas data center and to the smart gas user platform from the gas user corresponding to the target object via the smart gas service platform.

One or more embodiments of the present disclosure provide a non-transitory computer-readable storage medium, comprising a set of instructions, wherein when executed by a processor, the above-described method for gas usage monitoring and warning based the smart gas is implemented.

The beneficial effects of embodiments of this present disclosure at least include:

(1) Determining a gas device with gas usage safety problems and sending gas usage safety warning information to a gas user through gas usage data can examine the safety hazards in the daily gas usage and send a timely warning to the gas user, which facilitates the protection of gas usage safety of the gas user and reduces the probability of gas safety accidents.

(2) By receiving feedback information of the gas users, the accuracy of the gas safety warning information can be verified and the actual gas usage of the gas user can be understood in a timely manner. At the same time, the feedback information of the gas user facilitates the subsequent adjustment of the gas usage threshold and the suspicion threshold to improve the accuracy of determining the target object.

(3) Determining a gas usage threshold based on the environmental data can fully consider the impact of different seasons, time points and areas on gas usage, and thus can make adaptive adjustments to the gas usage threshold based on different environments, making the determination of the gas usage threshold more reasonable and accurate;

(4) Based on the feedback information of the user, the count of warnings, the count of feedback information and the suspicion to determine the gas usage threshold, the corresponding gas usage threshold can be flexibly adjusted for the gas usage of different users, thus making the gas safety warning information more in line with the actual gas usage of different users and reducing the risk of untimely warnings.

BRIEF DESCRIPTION OF THE DRAWINGS

This present disclosure will be further illustrated by way of exemplary embodiments, which will be described in detail by way of the accompanying drawings. These embodiments are not limiting, and in these embodiments the same numbering indicates the same structure wherein.

DETAILED DESCRIPTION

Figure 1:
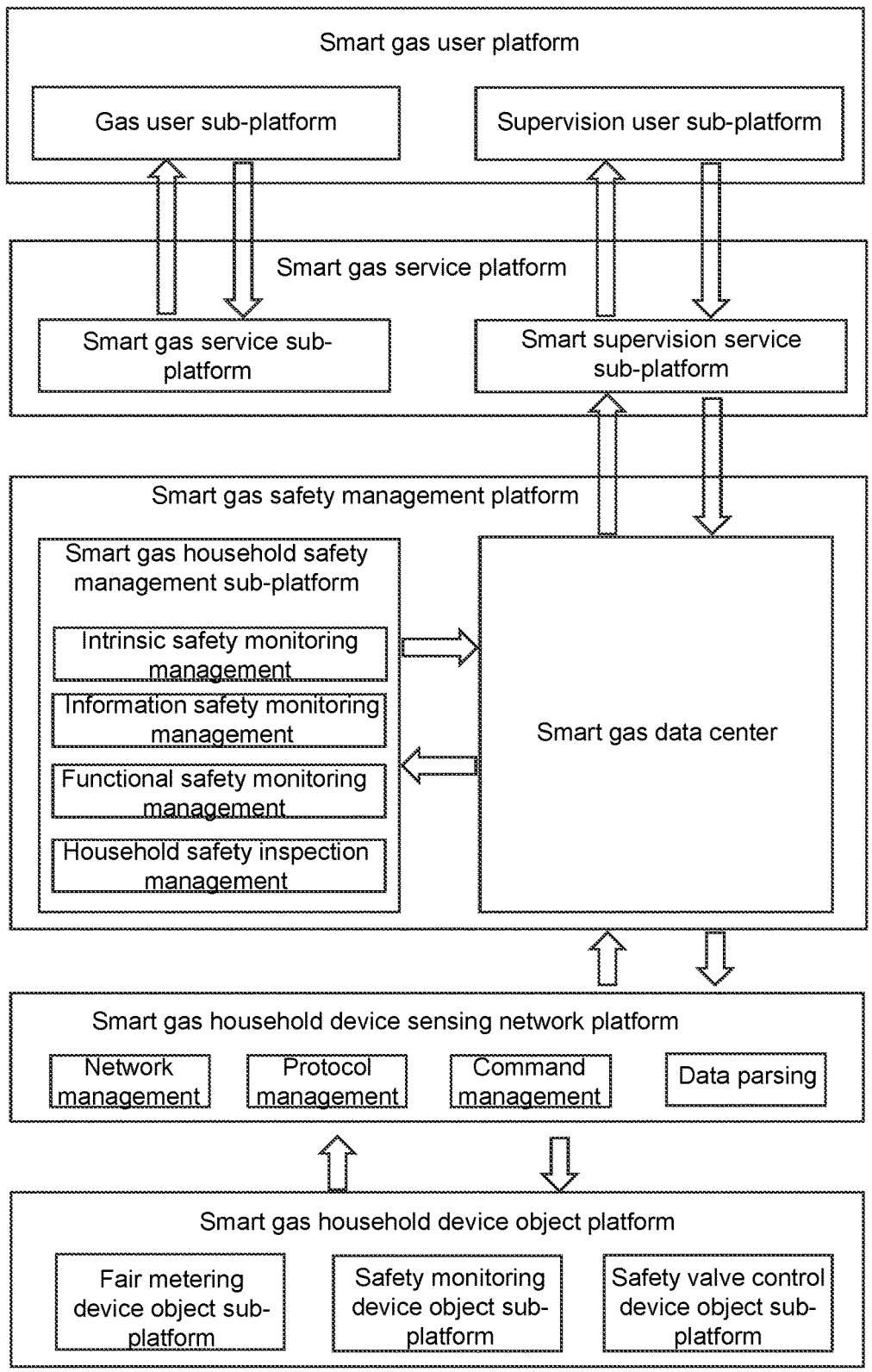
FIG. 1 is a structural diagram illustrating an Internet of Things system for gas usage safety warning based on smart gas according to some embodiments of this present disclosure.

The technical solutions of the present disclosure embodiments will be more clearly described below, and the accompanying drawings need to be configured in the description of the embodiments will be briefly described below. Obviously, the drawings in the following description are merely some examples or embodiments of the present disclosure, and will be applied to these accompanying drawings without having to pay creative labor. Other similar scenarios. Unless obviously obtained from the context or the context illustrates otherwise, the same numeral in the drawings refers to the same structure or operation.

It should be understood that the "system", "device", "unit" and/or "module" used herein is a method for distinguishing different components, elements, components, parts or assemblies of different levels. However, if other words may achieve the same purpose, the words may be replaced by other expressions.

As shown in the present disclosure and claims, unless the context clearly prompts the exception, "a", "one", and/or "the" is not specifically singular form, and the plural form may be included. It will be further understood that the terms "comprise," "comprises," and/or "comprising," "include," "includes," and/or "including," when used in present disclosure, specify the presence of stated features, integers, steps, operations, elements, and/or components, but do not preclude the presence or addition of one or more other features, integers, steps, operations, elements, components, and/or groups thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a structural diagram illustrating an Internet of Things system for gas usage safety warning based on smart gas according to some embodiments of this present disclosure. In some embodiments, the Internet of Things system 100 for gas usage safety warning based on smart gas may include a smart gas user platform, a smart gas service platform, a smart gas safety management platform, a smart gas household device sensing network platform, and a smart gas household device object platform that interact in sequence.

The smart gas user platform refers to a user-driven platform that interacts with a user. The user may be a gas user, a supervision user, etc. In some embodiments, the smart gas user platform may be configured as a terminal device. For example, the terminal device may include a mobile device, a tablet computer, etc., or any combination thereof. In some embodiments, the smart gas user platform may feedback information to the user through the terminal device. For example, the smart gas user platform may feedback gas usage safety warning information to the user through the terminal device (e.g., a display).

In some embodiments, the smart gas user platform may include a gas user sub-platform and a supervision user sub-platform. The gas user sub-platform is aimed at gas users. The gas users may refer to those who actually use gas, such as consumers. The supervision user sub-platform is aimed at supervision users, which can realize the supervision of the operation of the whole Internet of things system. The supervision users are the users of the gas safety supervision department.

In some embodiments, the gas user sub-platform may interact data with the smart gas service sub-platform of the smart gas service platform. For example, the gas user sub-platform may receive the gas usage safety warning information uploaded by the smart gas service sub-platform of the smart gas service platform, etc. The gas users may obtain the gas usage safety warning information through the gas user sub-platform.

In some embodiments, the supervision user sub-platform may interact data with a smart supervision service sub-platform of the smart gas service platform. For example, the supervision user sub-platform may issue a query instruction to the smart supervision service sub-platform of the smart gas service platform to obtain the monitoring information of the gas system in the corresponding jurisdiction.

The smart gas service platform may be a platform for receiving and transmitting data and/or information. The smart gas service platform may interact data with the smart gas user platform and the smart gas safety management platform. In some embodiments, the smart gas service platform may upload the gas usage safety warning information to the smart gas user platform.

In some embodiments, the smart gas service platform may include a smart gas service sub-platform and a smart supervision service sub-platform. The smart gas service platform may interact data with the gas user sub-platform and the supervision user sub-platform respectively, providing the gas users with the gas safety warning information and the supervision users with the monitoring information of the gas system respectively.

In some embodiments, the smart gas service platform may interact with the smart gas safety management platform. For example, the smart gas service platform may receive the gas usage safety warning information uploaded by the smart gas safety management platform.

The smart gas safety management platform may refer to a platform that coordinates and collaborates the links and collaboration between functional platforms. In some embodiments, the smart gas safety management platform may receive the gas usage data uploaded by the smart gas household device sensing network platform, analyze and process it, and upload the processed data to the smart gas user platform through the smart gas service platform. For example, the smart gas safety management platform may determine a gas monitoring object from at least one gas device based on the gas usage data; determine initial objects based on the gas monitoring object and a gas usage threshold; determine a target object based on historical gas data of the initial objects; and send gas usage safety warning information to a gas user corresponding to the target object.

In some embodiments, the smart gas safety management platform may include a smart gas household safety management sub-platform and a smart gas data center.

The smart gas household safety management sub-platform may be used to realize functions such as intrinsic safety monitoring management, information safety monitoring management, functional safety monitoring management and household safety inspection management. The intrinsic safety monitoring management may include the monitoring of mechanical leakage, electrical power consumption (smart control power consumption, communication power consumption, etc.), valve control, and other explosion-proof safety. The information safety monitoring management may include safety monitoring of data anomalies, illegal device information, illegal access, etc. The functional safety monitoring management may include safety monitoring of long unused, continuous flow timeout, flow overload, abnormally high flow, abnormally low flow, low air pressure, strong magnetic interference, low voltage, etc. The household safety inspection management may include monitoring the use of gas devices in the household.

The smart gas data center may aggregate and store all the operational data of the Internet of Things system 100 for gas usage safety warning based on the smart gas. The smart gas household safety management sub-platform interacts with the smart gas data center in both directions. In some embodiments, the smart gas data center may receive the gas usage data uploaded by the smart gas household device sensing network platform and send it to the smart gas household safety management sub-platform for analysis and processing. For example, the smart gas data center may send the gas usage data to the smart gas household safety management sub-platform for analysis and processing, and the smart gas household safety management sub-platform may send the processed gas usage data to the smart gas data center.

In some embodiments, the smart gas safety management platform may interact with the smart gas service platform and the smart gas household device sensing network platform through the smart gas data center.

The smart gas household device sensing network platform may be a functional platform to manage sensing communications. In some embodiments, the smart gas household device sensing network platform may be configured as a communication network and gateway for one or more of network management, protocol management, command management, and data parsing.

In some embodiments, the smart gas household device sensing network platform may interact data with the smart gas safety management platform and the smart gas household device object platform to achieve the functions of sensing information sensing communication and control information sensing communication. For example, the smart gas household device sensing network platform may receive the gas usage data uploaded by the smart gas household device object platform, or issue an instruction to obtain the gas usage data to the smart gas household device object platform. As another example, the smart gas household device sensing network platform may receive an instruction from the smart gas data center to obtain gas usage data, and upload the gas usage data to the smart gas data center.

The smart gas household device object platform may refer to the functional platform used to obtain sensing information. In some embodiments, the smart gas household device object platform may be configured to include at least one gas device. The gas device is configured with a unique identification that can be used to control the gas devices deployed in different areas of the city. The gas device is the relevant device placed at the gas users. The gas device may refer to a device that requires gas for its work. For example, the gas device may include a gas water heater, a gas stove, a dryer, a heating stove, etc. In some embodiments, the smart gas household device object platform may interact data with the smart gas household device sensing network platform to upload the obtained gas usage data to the smart gas household device sensing network platform.

In some embodiments, the smart gas household device object platform may include a fair metering device object sub-platform, a safety monitoring device object sub-platform, and a safety valve control device object sub-platform. The fair metering device object sub-platform may include a gas metering meter, etc., the safety monitoring device object sub-platform may include a gas meter, a thermometer, a barometer, etc., and the safety valve control device object sub-platform may include a valve control device, etc.

It should be noted that the above description of the system and its components is for descriptive convenience only and does not limit the present disclosure to the scope of the embodiments cited. It will be understood that it is possible for a person skilled in the art, with an understanding of the principle of the system, to make any combination of the components or to form sub-systems to connect to other components without departing from this principle. For example, the smart gas service platform and the smart gas safety management platform may be integrated in one component. As another example, the various components may share a common storage device, or each component may have its own storage device. Variants such as these are within the scope of protection of this present disclosure.

Figure 2:
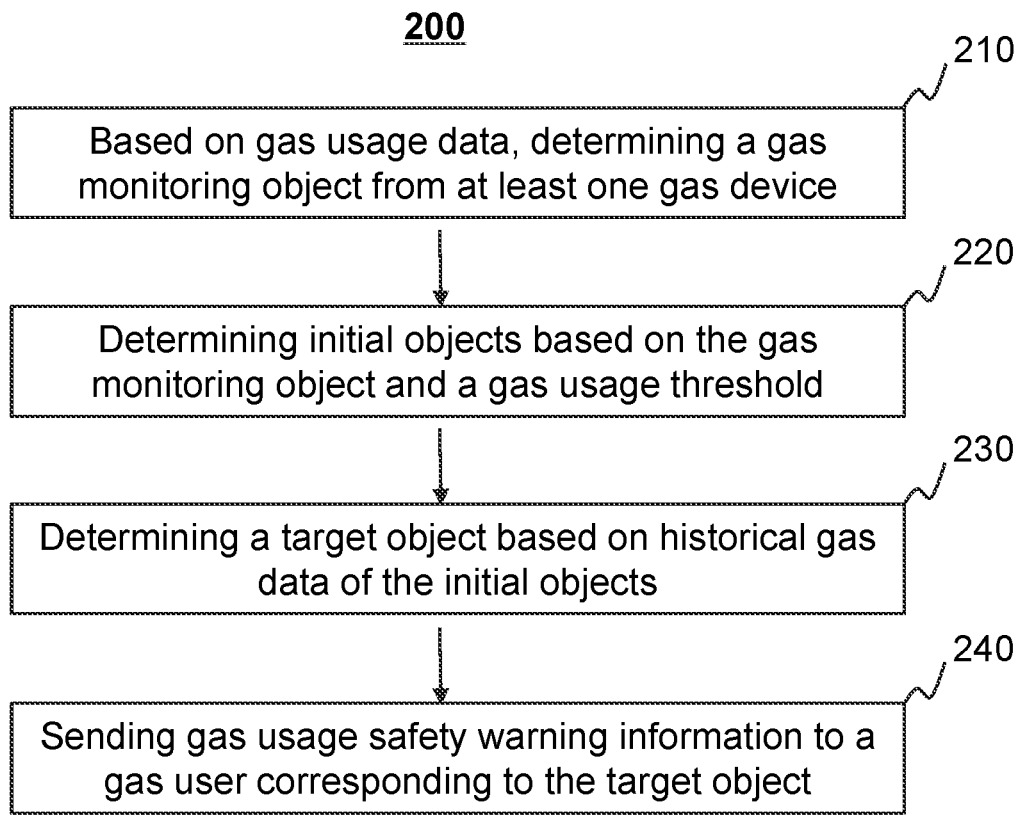
FIG. 2 is an exemplary flowchart illustrating a method for gas usage safety warning based on smart gas according to some embodiments of this present disclosure.

FIG. 2 is an exemplary flowchart illustrating a method for gas usage safety warning based on smart gas according to some embodiments of this present disclosure. As shown in FIG. 2, the process 200 includes the following steps. In some embodiments, the process 200 may be performed by a smart gas safety management platform.

Step 210, based on gas usage data, determining a gas monitoring object from at least one gas device.

The gas usage data may refer to data related to gas usage. In some embodiments, the gas usage data may include gas usage length, gas usage per unit time, usage frequency, and historical usage time periods. For example, the gas usage data of a gas cooker may include a gas usage of 1 cube per hour, a usage duration of 65 mins, a usage frequency of 3 times per day, a historical usage time period of 08:00-08:30 and 11:00-12:00, etc.

The gas usage data may be obtained through a gas metering device. The gas metering device may be used to record gas usage data such as the gas usage of the gas device. The gas metering device may include a gas flow meter, a gas meter, a thermometer, a barometer, a valve control device, etc. For example, the gas usage data may be obtained through a gas metering device such as a gas meter or a gas flow meter installed in the household.

The gas monitoring object may refer to the gas device with recent gas usage records. For example, the gas monitoring object may be all the gas meters in a district that have gas usage records in the last 3 days.

In some embodiments, the smart gas household safety management sub-platform may determine the gas monitoring object based on the gas usage data of the at least one gas device in a variety of ways. For example, the smart gas household safety management sub-platform may determine the gas device with gas usage records in the last 3 days as the gas monitoring object based on the historical usage time period in the gas usage data of at least one gas device. This present disclosure does not limit this.

Step 220, determining initial objects based on the gas monitoring object and a gas usage threshold.

The gas usage threshold may include a threshold for the safe gas usage under normal conditions. The gas usage threshold is related to the usage scenario. For example, cooking, bathing, and boiling water scenarios may have different gas usage thresholds.

In some embodiments, the gas usage threshold may include a usage length threshold and a usage volume threshold. The usage length threshold may refer to the length of duration allowed for safe gas usage. For example, the gas usage length allowed for cooking, bathing, boiling water, etc. The usage volume threshold refers to the volume of gas usage per unit time allowed for the safe gas usage. For example, the gas usage volume allowed for cooking for one hour, bathing for one hour, boiling water for one hour, etc.

In some embodiments, the gas usage threshold may be a system default value, an empirical value, a human preset value, etc., or any combination thereof, and may be set according to actual needs. The gas usage threshold may also be determined in other ways. For more information about the determining the gas usage threshold, please refer to FIG. 3 and its related description.

The initial objects may refer to the gas device that is initially determined to have a possible gas usage safety problem. For example, the initial objects may be a gas device with a gas usage length of more than 12 h. As another example, the initial objects may be a gas device that uses more gas per unit time than the normal unit of time. In some embodiments, each initial object may have a suspicion that is used to indicate the degree of suspicion that the initial object has a gas usage safety problem. For more information about the suspicion, please refer to FIG. 4 and its related description.

In some embodiments, the smart gas household safety management sub-platform may determine a gas monitoring object with gas usage data greater than the gas usage threshold as the initial objects based on the gas usage data of the gas monitoring object and the corresponding gas usage threshold. By way of example only, the smart gas household safety management sub-platform may determine the gas monitoring object whose gas usage length is greater than the usage length threshold as the initial object, and the gas monitoring object whose gas usage per unit time is greater than the usage threshold as the initial object.

Step 230, determining a target object based on historical gas data of the initial objects.

The historical gas data of the initial objects may refer to the gas-related data of the initial objects during the historical time period. In some embodiments, the historical gas data of the initial objects may include the basic data, historical usage data, and historical time data of the initial objects. The basic data may refer to the data related to the device state of the initial objects. The historical usage data may refer to the gas usage data of the initial objects during their historical usage. The historical time data may refer to the historical data related to the time when the initial objects used the gas. For more information about the basic data, the historical usage data, and the historical time data, please refer to FIG. 4 and its related description.

The target object may refer to a gas device that has a gas usage safety problem as further determined from the initial objects. For example, the target object may be the gas device with the highest suspicion ranking among the initial objects.

In some embodiments, the smart gas household safety management sub-platform may determine an initial object that meets a preset condition as the target object. By way of example only, the preset condition may be that the age of usage is greater than the preset age. For example, one or more of the initial objects whose use age(s) are older than a preset number of years of usage may be determined as a target object. As another example, the preset condition may be that the historical number of faults is greater than the preset number. For example, one or more of the initial objects with a historical number of faults greater than a preset number may be identified as a target object.

In some embodiments, the smart gas household safety management sub-platform may use an evaluation model to process the historical gas data of the initial objects to determine the suspicions of the initial objects. Further, the smart gas household safety management sub-platform may determine the target object based on the suspicion. For more information about the determining the target object, please refer to FIG. 4 and its related description.

Step 240, sending gas usage safety warning information to a gas user corresponding to the target object.

The gas usage safety warning information may refer to information that reminds users of gas safety. The gas usage safety warning information may be in the form of voice, text, etc. This present disclosure does not limit this.

In some embodiments, the smart gas household safety management sub-platform may send the gas usage safety warning information to the smart gas data center and, through the smart gas service platform, to the smart gas user platform of the corresponding gas user of the target object. For more information about the sending the gas usage safety warning information, please refer to FIG. 1 and its related description.

In some embodiments, the smart gas user platform may receive feedback information from the gas user corresponding to the target object regarding the gas usage safety warning information.

The feedback information may refer to the feedback from gas users on the accuracy of the gas usage safety warning information. The feedback information may include positive feedback information that the gas usage safety warning information is accurate, i.e., positive feedback information indicates that the gas users confirm the existence of gas usage safety problems. The feedback information may also include negative feedback information that the feedback gas usage safety warning information is inaccurate, i.e., the negative feedback information indicates that the gas users confirm that there is no gas usage safety problem.

The smart gas user platform receives feedback information from gas users about gas usage safety warning information in a variety of ways. As an example, the smart gas user platform receives the gas usage safety warning information and can remind gas users to provide feedback on whether the gas usage safety warning information is accurate. For example, the smart gas user platform may remind gas users to provide feedback on the accuracy of the gas usage safety warning information through voice, text and vibration. As another example, the gas users may take the initiative to provide feedback on gas safety problems through the smart gas user platform when it does not receive the gas usage safety warning information. For example, the gas users may proactively give feedback on the existence of gas safety problems.

In some embodiments of this present disclosure, by receiving feedback information of the gas users, the accuracy of the gas safety warning information can be verified and the actual gas usage of the gas user can be understood in a timely manner. At the same time, the feedback information of the gas user facilitates the subsequent adjustment of the gas usage threshold and the suspicion threshold to improve the accuracy of determining the target object.

In some embodiments of this present disclosure, the gas usage data is used to identify a gas device with gas usage safety problems and send the gas usage safety warning information to the gas user, so that the safety hazards in the daily use of gas can be investigated and the warning can be sent to the gas user in a timely manner, which facilitates the protection of the gas usage safety of the gas user and reduces the probability of gas safety accidents.

Figure 3:
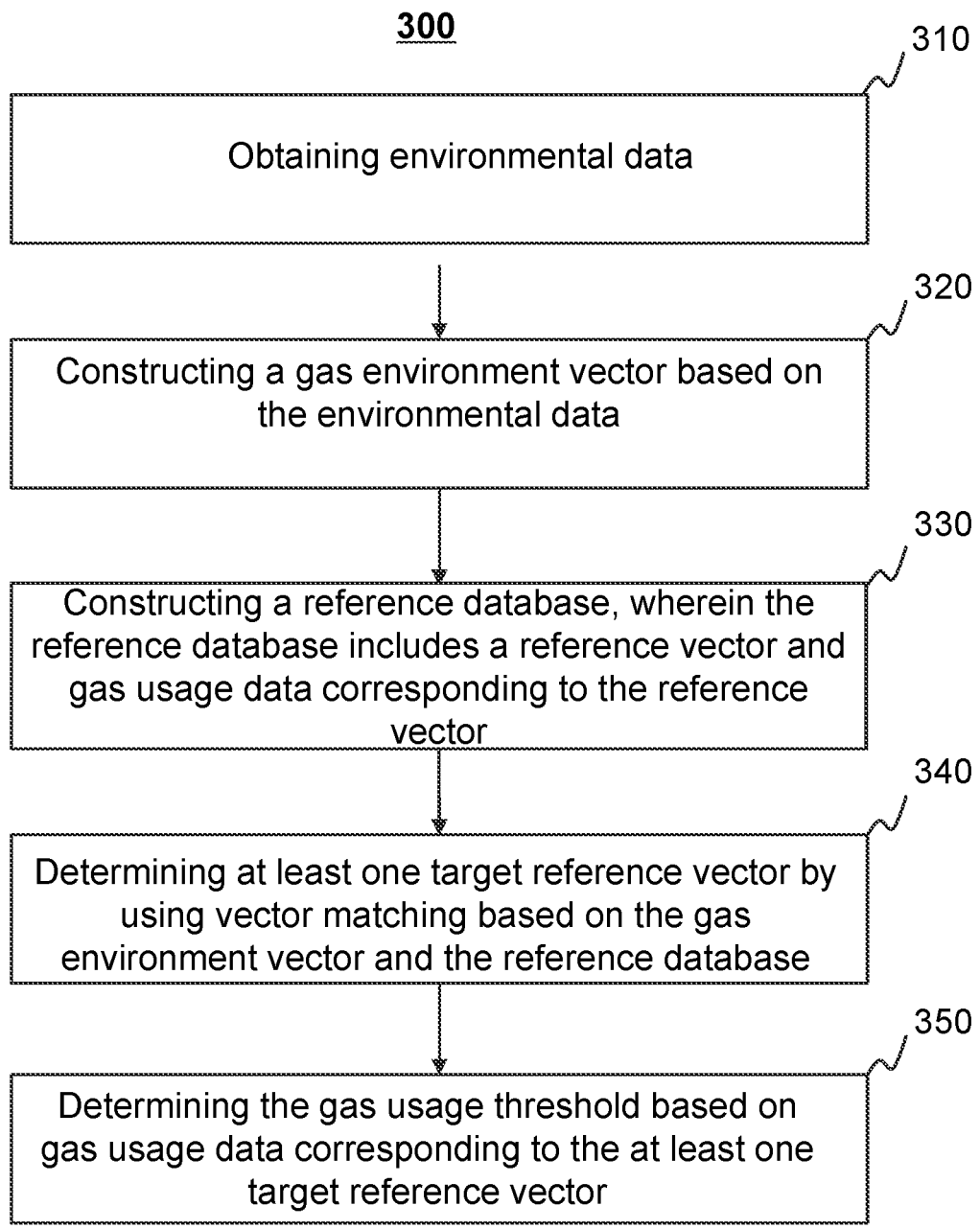
FIG. 3 is an exemplary flowchart illustrating the determining the gas usage threshold according to some embodiments of the present disclosure.

FIG. 3 is an exemplary flowchart illustrating the determining the gas usage threshold according to some embodiments of the present disclosure. As shown in FIG. 3, the process 300 includes the following steps. In some embodiments, the process 300 may be performed by the smart gas household safety management sub-platform.

Step 310, obtaining environmental data.

The environmental data may refer to environmental data related to current gas usage. In some embodiments, the environmental data may include seasonal information, time-point information, and area information.

The seasonal information may refer to information related to current gas usage of the season. For example, the seasonal information may include spring, summer, fall and winter. The seasonal information may also include the environmental temperature corresponding to the season.

The time-point information may refer to information related to the current gas usage at the time point. The time-point information may include information such as a gas usage date, a start time point, an end time point and a usage time period.

The area information may refer to the information related to the area where the current gas device is located. The area information may include geographical area information of the gas device, administrative division area information, etc.

In some embodiments, the smart gas household safety management sub-platform may obtain the environmental data based on a variety of ways. For example, the smart gas household safety management sub-platform may obtain the environmental data stored in the smart gas data center. Specifically, the seasonal information may be obtained from the smart gas data center based on the network, and the time-point information and the area information may be obtained from the smart gas household device object platform based on the smart gas data center. As another example, the smart gas household safety management sub-platform may obtain the environmental in a manual way. Specifically, the environmental data input by the user terminal may be obtained.

In some embodiments, the smart gas household safety management sub-platform may determine a gas usage threshold based on the environmental data by using vector matching. The process of determining the gas usage threshold by using vector matching will be described by the following steps 320-step 350.

Step 320, constructing a gas environment vector based on the environmental data.

The gas environment vector may refer to a vector constructed from environmental data related to gas usage. For example, the gas environment vector=(a, b, c) may be constructed, where a may represent seasonal information in the environmental data, b may represent time-point information, and c may represent area information. Exemplarily, the gas environment vector=(winter, 9:00-10:00, Community A) may indicate that a particular gas device located in Community A is in use during the winter, with usage times of 9:00-10:00.

In some embodiments, the smart gas household safety management sub-platform may construct a gas environment vector by any feasible algorithm based on the environmental data. For example, a vector may be extracted by a model. As another example, the gas environment vector may be constructed manually.

Step 330, constructing a reference database, wherein the reference database includes a reference vector and gas usage data corresponding to the reference vector.

The reference database consists of multiple reference vectors and their corresponding gas usage data.

The reference vector may refer to a vector constructed based on historical environmental data. The historical environmental data may include environmental data for a certain historical time period. For example, the historical environmental data may be the environmental data corresponding to the gas usage in a historical month.

The gas usage data corresponding to the reference vector may include the usage length and usage volume when the reference vector corresponds to the gas usage. For example, the reference vector=(autumn, 18:00-19:00, Community A), indicates that a gas device located in Community A is used in autumn, with the usage time of 18:00-19:00, and its corresponding gas usage data may include the gas usage length of 1 hour, the gas usage volume of 1 cubic meter per hour, etc.

In some embodiments, the smart gas household safety management sub-platform may determine the reference vector based on the historical environmental data in a variety of ways. For example, the historical gas environment vector corresponding to the historical environment data may be vector clustered based on a clustering algorithm (e.g., K-mean algorithm) to obtain at least one cluster center. Further, the historical gas environment vector corresponding to the at least one cluster center may be used as a reference vector, and the gas usage data corresponding to this historical gas environment vector may be used as the gas usage data corresponding to the reference vector. This present disclosure does not limit this.

Step 340, determining at least one target reference vector by using vector matching based on the gas environment vector and the reference database.

The target reference vector may refer to a reference vector that matches the gas environment vector. For more information about the target reference vector, please refer to the reference vector above.

In some embodiments, the smart gas household safety management sub-platform may determine at least one target reference vector by using vector matching in various feasible ways based on the gas environment vector and the reference database. For example, a similarity between the reference vector in the reference vector library and the gas environment vector may be calculated, and the reference vector with a similarity greater than a similarity threshold is used as the target reference vector. The similarity may be expressed based on a vector distance, and the smaller the vector distance is, the higher the similarity is. The vector distance may be expressed based on cosine distance, Euclidean distance, or Hamming distance, etc.

Step 350, determining the gas usage threshold based on gas usage data corresponding to the at least one target reference vector.

In some embodiments, the smart gas household safety management sub-platform may determine a usage length threshold based on the usage length in the gas usage data corresponding to the at least one target reference vector, and a usage volume threshold based on the usage volume in the gas usage data corresponding to the at least one target reference vector. For example, an average value of the usage length in the gas usage data corresponding to at least one target reference vector may be used as the usage length threshold, and an average value of the usage volume in the gas usage data corresponding to at least one target reference vector may be used as the usage volume threshold. As another example, the smart gas household safety management sub-platform may use the gas usage data corresponding to the target reference vector with the highest similarity as the gas usage threshold.

In some embodiments of this present disclosure, determining a gas usage threshold based on the environmental data can fully consider the impact of different seasons, time points and areas on gas usage, and thus can make adaptive adjustments to the gas usage threshold based on different environments, making the determination of the gas usage threshold more reasonable and accurate.

In some embodiments, the smart gas household safety management sub-platform may adjust the gas usage threshold based on feedback information from gas users or the number of gas usage safety warnings.

The feedback information from the gas users refers to the feedback from the gas users about the gas safety warning information. For more information about the feedback information, please refer to FIG. 2 and its related description.

The number of gas usage safety warnings may refer to the number of times a gas user receives gas usage safety warning information within a certain time period. For example, the number of gas usage safety warnings may be the number of gas usage safety warning information received in a historical month.

In some embodiments, the smart gas household safety management sub-platform may adjust the gas usage threshold based on the feedback information from gas users. For example, when the number of inaccurate gas usage safety warnings (subsequently referred to as "invalid warnings") received from users is too high, the gas usage threshold may be increased. If the number of invalid warnings caused by the usage length is too high, the usage length threshold may be increased; if the number of invalid warnings caused by usage volume is too high, the usage volume threshold may be adjusted. As another example, if a user gives feedback on gas safety problems but the gas usage safety warning information is not timely or has not been issued, the gas usage threshold may be lowered.

In some embodiments, the smart gas household safety management sub-platform may adjust the gas usage threshold based on the number of gas usage safety warnings. For example, a first threshold of the number of gas users receiving gas usage safety warnings over a period of time may be preset. When the number of gas usage safety warnings by gas users over a period of time exceeds the first threshold, it can further determine whether the number of times that the gas users feedback gas usage safety warning information being inaccurate exceeds a second threshold or a third threshold. The second threshold is the threshold that corresponds to the feedback when the gas usage safety warning information caused by the usage length is inaccurate. The third threshold is the threshold when the feedback of the gas usage safety warning information caused by the usage volume is inaccurate. If the number of invalid warnings exceeds the second threshold, the usage length threshold may be adjusted upwards accordingly; if the number of invalid warnings exceeds the third threshold, the usage volume threshold may be adjusted accordingly. As another example, if a gas user does not receive gas safety warning information during the gas usage process, but the user feeds back that there is a gas usage safety problem, the gas usage threshold may be adjusted downward accordingly. The adjustment amount of the gas usage threshold may be determined by human beings. The first threshold is greater than the second threshold or the third threshold. The first threshold, the second threshold and the third threshold may be a system default value, an empirical value, a human preset value, or any combination thereof, or set according to actual needs, and this present disclosure does not limit this.

In some embodiments of this present disclosure, the gas usage threshold is determined based on the user's feedback information and the number of warnings, and the corresponding gas usage threshold can be flexibly adjusted for the gas usage of different users, thus making the gas usage safety warning information more consistent with the actual gas usage of different users.

In some embodiments, the smart gas household safety management sub-platform may also adjust the gas usage threshold based on the number of user feedbacks and suspicion of the gas user.

The number of user feedback may refer to the number of times a gas user gives feedback on whether the gas usage safety warning information is inaccurate over a period of time. For example, the number of user feedbacks may be the number of times in the past month that a gas user has fed back gas usage safety warning information as inaccurate. The number of user feedbacks may include the number of positive feedbacks where the feedbacks are accurate and the number of negative feedbacks where the feedbacks are inaccurate.

The suspicion refers to the degree of suspicion that there is a gas usage safety problem with the gas device when the gas is used. The higher the suspicion is, the higher the likelihood that the gas device has a gas usage safety problem, and the higher the likelihood that a gas usage safety warning will be required. The suspicion may be expressed in various ways. For example, the suspicion may be expressed as a numerical representation from 0 to 100. In some embodiments, the suspicion level may be obtained based on an evaluation model. For more information about the suspicion and the evaluation model, please refer to FIG. 4 and its related description.

In some embodiments, the smart gas household safety management sub-platform may adjust the gas usage thresholds in various feasible ways based on the number of user feedbacks and suspicion of gas users. For example, when the number of negative feedbacks from gas users is low and the suspicion is less than a suspicion threshold, the gas usage threshold may be adjusted upwards. When the number of positive feedback from gas users is high and the suspicion is greater than the suspicion threshold, the gas usage threshold may be adjusted downward. For more information about the suspicion threshold, please refer to FIG. 4 and its related description.

In some embodiments of this present disclosure, adjusting the gas usage threshold based on the number and suspicion of the user's historical feedback information can make the gas usage threshold more consistent with the user's gas usage, improve the accuracy of the warning information, and reduce the risk of untimely warnings.

Figure 4:
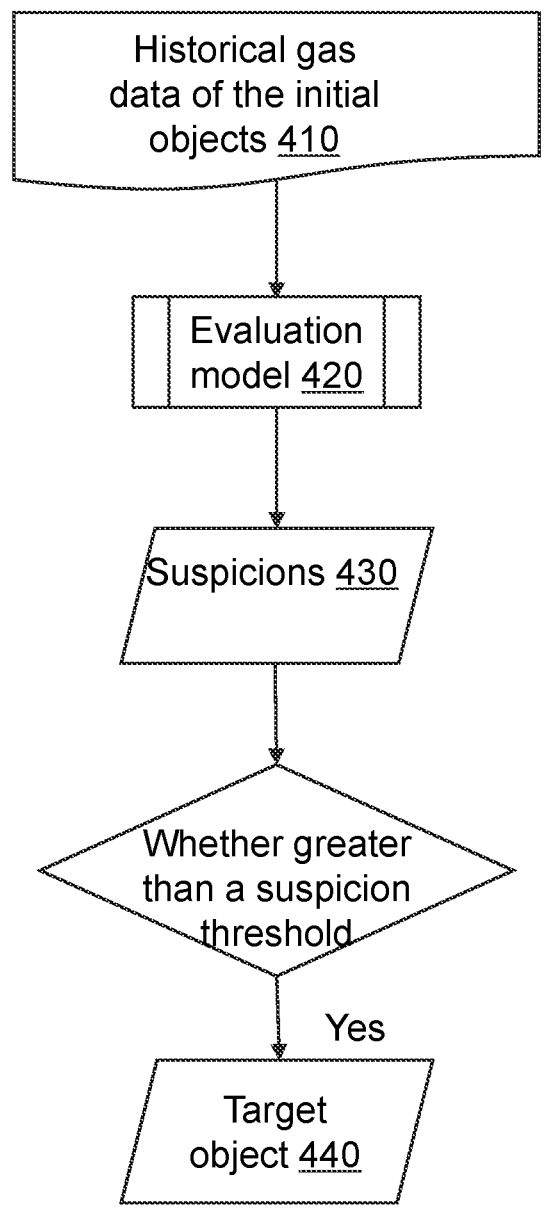
FIG. 4 is an exemplary schematic diagram illustrating the determining the target object according to some embodiments of the present disclosure.

FIG. 4 is an exemplary schematic diagram illustrating the determining the target object according to some embodiments of the present disclosure.

In some embodiments, the smart gas household safety management sub-platform may use an evaluation model to determine the suspicions of the initial objects, as well as to determine the target object based on the suspicions.

The evaluation model may be used to determine the suspicions of the initial objects. The evaluation model is a machine learning model, and in some embodiments, the evaluation model may include any one or a combination of various feasible models such as a Recurrent Neural Network (RNN) model, a Deep Neural Network (DNN) model, a Convolutional Neural Network (CNN) model, etc.

As a specific example, as shown in FIG. 4, the smart gas household safety management sub-platform uses an evaluation model 420 to determine the suspicion 430s of the initial objects. An input to the evaluation model 420 is historical gas data 410 of the initial objects and an output is the suspicions 430 of the initial objects.

Figure 5:
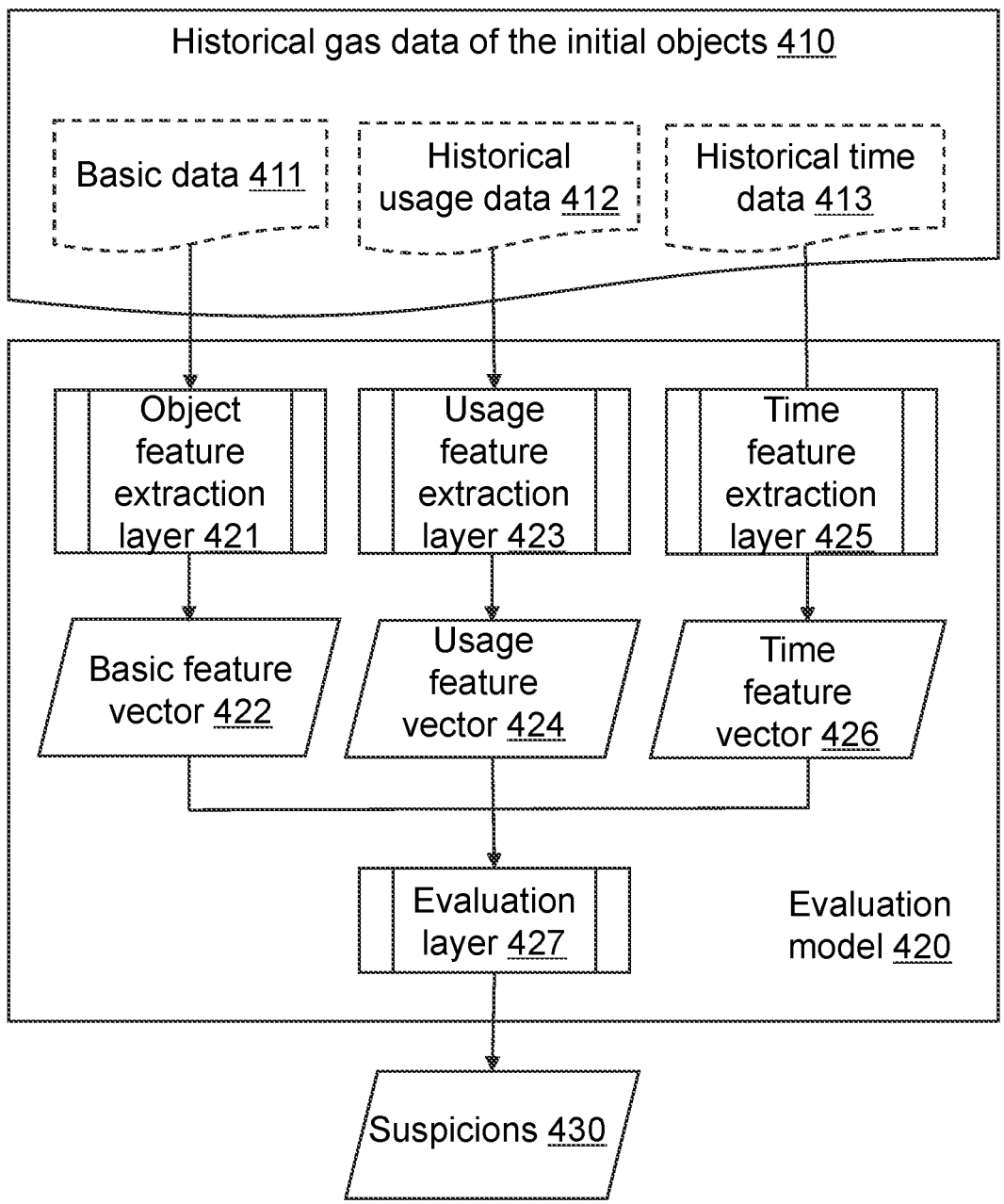
FIG. 5 is an exemplary schematic diagram illustrating an evaluation model according to some embodiments of the present disclosure.

In some embodiments, the evaluation model may include multiple processing layers. FIG. 5 is an exemplary schematic diagram illustrating an evaluation model according to some embodiments of the present disclosure. As shown in FIG. 5, the evaluation model 420 may include an object feature extraction layer 421, a usage feature extraction layer 423, a time feature extraction layer 425, and an evaluation layer 427.

The object feature extraction layer 421 is used to process basic data 411 of the initial objects and determine the basic feature vector 422. The object feature extraction layer 421 may be constructed based on CNN, RNN and other models. The basic data may refer to the data related to the device state of the initial objects. For example, the basic data of the initial objects may include the safety performance of the gas device, energy consumption, usage age, and maintenance within the last year. The basic feature vector is a feature vector constructed based on the underlying data of the initial objects. For example, the basis feature vector may be represented as =(a, b, c, d . . . ), where each element may represent one type of basis data.

The usage feature extraction layer 423 is used to process historical usage data 412 of the initial objects to determine the usage feature vector 424. The usage feature extraction layer may be CNN, RNN and other structures. The historical usage data of the initial objects may refer to data such as the usage length of the gas device and the usage volume per unit time. The usage feature vector is a feature vector constructed based on the historical usage data of the initial objects. For example, the usage feature vector may be represented as =(a, b), where a may represent the usage length and b may represent the usage volume per unit time.

The time feature extraction layer 425 is used to process the historical time data 413 of the initial objects and determine the time feature vector 426. The time feature extraction layer may be structures such as CNN, RNN, etc. The historical time data of the gas usage of the initial objects may refer to the data of the start time point of the gas device, the end time point of the usage, the number of times of usage in a day, the number of times of usage in a week, etc. The time feature vector is a feature vector constructed based on the historical time data of the initial objects. For example, the time feature vector may be represented as =(a, b, c . . . ), where each element may represent one type of historical time data.

The evaluation layer 427 is used to process the basic feature vector 422, the usage feature vector 424, and the time feature vector 426 to determine the suspicions 430 of the initial objects. The evaluation layer may be a structure such as Long Short-Term Memory (LSTM) network.

In some embodiments, the evaluation model may be obtained by joint training. The training sample used for joint training may include the basic data of the initial objects of the sample, historical usage data and historical time data, and the training sample is derived from historical data. The label of the training sample is the actual suspicion of the initial object of the sample. The label may be derived from historical data or labeled manually. By way of example only, a human may make an evaluation of the current suspicion of historical data based on experience to determine the actual suspicion based on historical data. For example, the suspicion may be any value between 0 and 1, where 0 indicates that there is no gas usage safety problem (i.e., no abnormality has occurred or is likely to occur), 1 indicates that there is a gas usage safety problem (i.e., an abnormality has occurred), and other values indicate that there may be a gas usage safety problem (i.e., no abnormality has occurred but may occur), and the size of the value indicates the suspicion that there is a gas usage safety problem.

The exemplary joint training process includes: inputting the basic data, the historical usage data and the historical time data of the sample initial objects into the initial object feature extraction layer, the initial usage feature extraction layer and the initial time feature extraction layer, respectively, to obtain the basic feature vector outputted by the initial object feature extraction layer, the usage feature vector outputted by the initial usage feature extraction layer and the time feature vector outputted by the initial time feature extraction layer, and then inputting the basic feature vector, the usage feature vector and the time feature vector into the initial evaluation layer to obtain the suspicion of the sample initial object outputted by the evaluation layer. Based on the output results of the label and the initial evaluation layer, the loss function is established, the parameters of the initial object feature extraction layer, the initial usage feature extraction layer, the initial time feature extraction layer and the initial evaluation layer are updated, the model training is completed when the loss function meets the preset condition, and the trained evaluation model is obtained. The preset condition may be that the loss function converges, the number of iterations reaches a threshold number of iterations, etc.

In some embodiments of this present disclosure, the suspicion is determined by the evaluation model, which can fully consider the influence of the basic data and usage of the gas device on the suspicion, reduce the calculation of the suspicion, and improve the efficiency and accuracy of the calculation of the suspicion. Moreover, obtaining the trained evaluation model by joint training is helpful to solve the problem of difficult to obtain the label when training object feature extraction layer, usage feature extraction layer and time feature extraction layer separately in some cases. At the same time, obtaining the trained evaluation model based on joint training can make the evaluation model better to get the doubtfulness.

In some embodiments, the smart gas household safety management sub-platform may determine a target object based on the suspicion. For example, the smart gas household safety management sub-platform may determine the initial objects with the top suspicion ranking as the target object based on the ranking of suspicion from largest to smallest. Exemplarily, the initial object in the top 3 or top 20% of the ranking may be determined as the target object.

In some embodiments, the smart gas household safety management sub-platform may determine the target object based on a suspicion threshold. As a specific example, as shown in FIG. 4, the smart gas household safety management sub-platform may determine whether the suspicions 430 are greater than a suspicion threshold, and identify the initial objects whose suspicions 430 are greater than the suspicion threshold as the target object 440.

The suspicion threshold is the threshold condition used to determine the target object. For example, the suspicion threshold may be expressed by a specific value.

The suspicion threshold may be a system default value, an empirical value, a human preset value, or any combination thereof, and can be set according to actual needs. In some embodiments, the suspicion threshold may be determined based on historical data. For example, an average of the historically used suspicion threshold may be used as the current suspicion threshold.

In some embodiments, the suspicion threshold may also be adjusted based on feedback information from gas users. For example, when gas users give feedback on the number of inaccurate gas usage safety warnings, the suspicion threshold may be manually adjusted. If the content of the feedback information is that there is a gas usage safety problem but the gas usage safety warning is not timely, the suspicion threshold may be adjusted downward; if the content of the feedback information is that there is no gas usage safety problem but gas usage safety warning information is received, the suspicion threshold may be adjusted upwards.

In some embodiments of this specification, the target object is determined based on the suspicion threshold, which can make the determination of the target object more reasonable and the sending of gas usage safety warning information more targeted, avoiding the impact on users with normal gas usage.

The basic concepts have been described above, apparently, in detail, as will be described above, and does not constitute a limitation of the specification. Although there is no clear explanation here, those skilled in the art may make various modifications, improvements, and modifications of present disclosure. This type of modification, improvement, and corrections are recommended in present disclosure, so this class is modified, improved, and the amendment remains in the spirit and scope of the exemplary embodiment of the present disclosure.

At the same time, present disclosure uses specific words to describe the embodiments of the present disclosure. As "one embodiment", "an embodiment", and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of present disclosure are not necessarily all referring to the same embodiment. Further, certain features, structures, or features of one or more embodiments of the present disclosure may be combined.

Moreover, unless the claims are clearly stated, the sequence of the present disclosure, the use of the digital letters, or the use of other names, is not configured to define the order of the present disclosure processes and methods. Although some examples of the invention currently considered useful in the present invention are discussed in the above disclosure, it should be understood that the details of this class will only be described, and the appended claims are not limited to the disclosure embodiments. The requirements are designed to cover all modifications and equivalents combined with the substance and range of the present disclosure. For example, although the implementation of various components described above may be embodied in a hardware device, it may also be implemented as a software only solution, e.g., an installation on an existing server or mobile device.

Similarly, it should be noted that in order to simplify the expression disclosed in the present disclosure and help the understanding of one or more invention embodiments, in the previous description of the embodiments of the present disclosure, a variety of features are sometimes combined into one embodiment, drawings or description thereof. However, this disclosure method does not mean that the characteristics required by the object of the present disclosure are more than the characteristics mentioned in the claims. Rather, claimed subject matter may lie in less than all features of a single foregoing disclosed embodiment.

In some embodiments, numbers expressing quantities of ingredients, properties, and so forth, configured to describe and claim certain embodiments of the application are to be understood as being modified in some instances by the term "about," "approximate," or "substantially". Unless otherwise stated, "approximately", "approximately" or "substantially" indicates that the number is allowed to vary by ±20%. Accordingly, in some embodiments, the numerical parameters used in the specification and claims are approximate values, and the approximate values may be changed according to characteristics required by individual embodiments. In some embodiments, the numerical parameters should be construed in light of the number of reported significant digits and by applying ordinary rounding techniques. Although the numerical domains and parameters used in the present disclosure are configured to confirm its range breadth, in the specific embodiment, the settings of such values are as accurately as possible within the feasible range.

For each patent, patent application, patent application publication and other materials referenced by the present disclosure, such as articles, books, instructions, publications, documentation, etc., hereby incorporated herein by reference. Except for the application history documents that are inconsistent with or conflict with the contents of the present disclosure, and the documents that limit the widest range of claims in the present disclosure (currently or later attached to the present disclosure). It should be noted that if a description, definition, and/or terms in the subsequent material of the present disclosure are inconsistent or conflicted with the content described in the present disclosure, the use of description, definition, and/or terms in this manual shall prevail.

Finally, it should be understood that the embodiments described herein are only configured to illustrate the principles of the embodiments of the present disclosure. Other deformations may also belong to the scope of the present disclosure. Thus, as an example, not limited, the alternative configuration of the present disclosure embodiment may be consistent with the teachings of the present disclosure. Accordingly, the embodiments of the present disclosure are not limited to the embodiments of the present disclosure clearly described and described.

What is claimed is:

1. A method for gas usage monitoring and warning based on smart gas, which is performed by a smart gas safety management platform of an Internet of Things system for gas usage monitoring and warning based on smart gas, comprising:

obtaining gas usage data from at least one gas device through a smart gas household device sensing network platform of the Internet of Things system and sending the gas usage data to the smart gas safety management platform, wherein the at least one gas device is configured in a smart gas household device object platform of the Internet of Things system;

based on the gas usage data, determining a gas monitoring object from the at least one gas device;

determining initial objects based on the gas monitoring object and a gas usage threshold, the gas usage threshold including a usage length threshold and a usage volume threshold;

processing historical gas data of the initial objects by using an evaluation model to determine suspicions of the initial objects, wherein the evaluation model is a machine learning model and obtained through joint training;

determining a target object based on the suspicions; and sending gas usage safety warning information to a gas user corresponding to the target object;

wherein the determining the gas usage threshold includes:

obtaining environmental data, wherein the environmental data includes seasonal information, time-point information, and area information;

constructing a gas environment vector based on the environmental data;

constructing a reference database, wherein the reference database includes a reference vector and gas usage data corresponding to the reference vector, the reference vector being constructed based on historical environmental data;

determining at least one target reference vector by using vector matching based on the gas environment vector and the reference database; and determining the gas usage threshold based on gas usage data corresponding to the at least one target reference vector.

2. The method of claim 1, wherein the Internet of Things system for gas usage monitoring and warning based on smart gas further includes a smart gas user platform and a smart gas service platform interacted in sequence, wherein the smart gas safety management platform includes a smart gas household safety management sub-platform and a smart gas data center, and the method further includes:
by the smart gas household safety management sub-platform, sending the gas safety warning information to the smart gas data center and to the smart gas user platform of the gas user corresponding to the target object via the smart gas service platform.

3. The method of claim 1, wherein the determining the target object based on the suspicions includes:
determining an initial object with a suspicion greater than a suspicion threshold as the target object.

4. The method of claim 3, wherein the suspicious threshold is determined based on feedback information from the gas user.

5. The method based of claim 1, wherein the determining the gas usage threshold further includes:
adjusting the gas usage threshold based on feedback information of the gas user or a count of gas usage safety warnings.

6. The method of claim 1, wherein the determining the gas usage threshold further includes:
adjusting the gas usage threshold based on a count of user feedback and a suspicion of the gas user, wherein the count of user feedback is a count of feedback of the gas user on whether the gas usage safety warning information is accurate.

7. The method of claim 1, wherein the evaluation model includes an object feature extraction layer, a usage feature extraction layer, a time feature extraction layer and an evaluation layer;

the object feature extraction layer is used to process basic data of the initial objects to determine a basic feature vector, and the basic data includes data related to a device state of the initial objects;

the usage feature extraction layer is used to process historical usage data of the initial objects to determine a usage feature vector, and the historical usage data includes a usage length of the gas device and a usage volume per unit time;

the time feature extraction layer is used to process historical time data of the initial objects using gas to determine a time feature vector, and the historical time data includes data of a start time point of the gas device, an end time point of usage, a count of times of usage in a day, or a count of times of usage in a week; and the evaluation layer is used to process the basic feature vector, the usage feature vector and the time feature vector to determine the suspicions of the initial objects.

8. The method of claim 1, wherein the method further includes:
receiving feedback information for the gas usage safety warning information from the gas user corresponding to the target object via the smart gas user platform.

9. A non-transitory computer-readable storage medium, comprising a set of instructions, wherein when executed by a processor, the method for gas usage monitoring and warning based the smart gas of claim 1 is implemented.

10. An Internet of Things system for gas usage monitoring and warning based on smart gas, wherein the Internet of Things system comprises a smart gas user platform, a smart gas service platform, a smart gas safety management platform, a smart gas household device sensing network platform and a smart gas household device object platform interacted in sequence, wherein the smart gas safety management platform includes a smart gas household safety management sub-platform and a smart gas data center, the smart gas data center is configured to:

obtain gas usage data from at least one gas device through the smart gas household device sensing network platform and send the gas usage data to the smart gas household safety management sub-platform, wherein the at least one gas device is configured in the smart gas household device object platform; and the smart gas household safety management sub-platform is configured to:

based on the gas usage data, determine a gas monitoring object from the at least one gas device;

determine initial objects based on the gas monitoring object and a gas usage threshold, the gas usage threshold including a usage length threshold and a usage volume threshold;

process historical gas data of the initial objects by using an evaluation model to determine suspicions of the initial objects, wherein the evaluation model is a machine learning model and obtained through joint training;

determine a target object based on the suspicions; and send gas safety warning information to the smart gas data center and to the smart gas user platform of the gas user corresponding to the target object via the smart gas service platform;

wherein to determine the gas usage threshold, the smart gas household safety management sub-platform is further configured to:

obtain environmental data, wherein the environmental data includes seasonal information, time-point information, and area information;

construct a gas environment vector based on the environmental data;

construct a reference database, wherein the reference database includes a reference vector and gas usage data corresponding to the reference vector, the reference vector being constructed based on historical environmental data;

determine at least one target reference vector by using vector matching based on the gas environment vector and the reference database; and determine the gas usage threshold based on gas usage data corresponding to the at least one target reference vector.

11. The Internet of Things system of claim 10, wherein the evaluation model includes an object feature extraction layer, a usage feature extraction layer, a time feature extraction layer and an evaluation layer;

the object feature extraction layer is used to process basic data of the initial objects to determine a basic feature vector, and the basic data includes data related to a device state of the initial objects;

the usage feature extraction layer is used to process the historical usage data of the initial objects to determine a usage feature vector, and the historical usage data includes a usage length of the gas device and a usage volume per unit time;

the time feature extraction layer is used to process historical time data of the initial objects using gas to determine a time feature vector, and the historical time data includes data of a start time point of the gas device, an end time point of usage, a count of times of usage in a day, or a count of times of usage in a week; and the evaluation layer is used to process the basic feature vector, the usage feature vector and the time feature vector to determine the suspicions of the initial objects.

12. The Internet of Things system of claim 11, wherein in order to determine the target object based on the suspicions, the smart gas household safety management sub-platform is further configured to:

determine an initial object with a suspicion greater than a suspicion threshold as the target object.

13. The Internet of Things system of claim 12, wherein the suspicious threshold is determined based on feedback information from the gas user.

14. The Internet of Things system of claim 10, wherein the smart gas household safety management sub-platform is further configured to:

adjust the gas usage threshold based on feedback information of the gas user or a count of gas usage safety warnings.

15. The Internet of Things system of claim 10, wherein the smart gas household safety management sub-platform is further configured to:

adjust the gas usage threshold based on a count of user feedback and a suspicion of the gas user, wherein the count of user feedback is a count of feedback of the gas user on whether the gas usage safety warning information is accurate.

16. The Internet of Things system of claim 10, wherein the smart gas household safety management sub-platform is further configured to:

receive feedback information for the gas usage safety warning information from the gas user corresponding to the target object via the smart gas user platform.

* * * * *